United States Patent
Shiozaki et al.

(10) Patent No.: US 12,206,139 B2
(45) Date of Patent: Jan. 21, 2025

(54) PROTECTIVE TAPE FOR POSITIVE ELECTRODE LEAD INCLUDING ADHESIVE LAYER HAVING HEAT RESISTANT FILLER, AND BATTERY INCLUDING THE SAME

(71) Applicant: Panasonic Intellectual Property Management Co., Ltd., Osaka (JP)

(72) Inventors: Tomoki Shiozaki, Osaka (JP); Kazuhiro Yoshii, Osaka (JP); Hajime Nishino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 697 days.

(21) Appl. No.: 17/283,663

(22) PCT Filed: Oct. 4, 2019

(86) PCT No.: PCT/JP2019/039319
§ 371 (c)(1),
(2) Date: Apr. 8, 2021

(87) PCT Pub. No.: WO2020/085048
PCT Pub. Date: Apr. 30, 2020

(65) Prior Publication Data
US 2022/0013875 A1    Jan. 13, 2022

(30) Foreign Application Priority Data
Oct. 23, 2018   (JP) .................................. 2018-199474

(51) Int. Cl.
*H01M 50/586*   (2021.01)
*C08K 3/22*   (2006.01)
(Continued)

(52) U.S. Cl.
CPC ............. *H01M 50/586* (2021.01); *C09J 7/25* (2018.01); *C09J 133/08* (2013.01); *H01M 4/525* (2013.01);
(Continued)

(58) Field of Classification Search
CPC ............. H01M 50/586; H01M 50/533; H01M 50/534; H01M 50/595; H01M 4/525; H01M 10/0525; C01J 7/25; C09J 133/08
(Continued)

(56) References Cited

U.S. PATENT DOCUMENTS

2013/0071696 A1*   3/2013   Kim .................... H01M 50/178
429/7
2013/0344276 A1   12/2013   Seitz et al.
(Continued)

FOREIGN PATENT DOCUMENTS

CN   101667632 A  *  3/2010
CN   103865449 A  *  6/2014
(Continued)

OTHER PUBLICATIONS

International Search Report dated Nov. 19, 2019, issued in counterpart International Application No. PCT/JP2019/039319 (2 pages).
(Continued)

*Primary Examiner* — Sean P Cullen
(74) *Attorney, Agent, or Firm* — WHDA, LLP

(57) ABSTRACT

A battery includes a positive electrode, a negative electrode, a positive electrode lead which is connected to the positive electrode, and a protective tape which covers the positive electrode lead. The protective tape includes a base material layer and an adhesive layer that is arranged on the base material layer; and the adhesive layer contains an adhesive material and a filler which contains at least one compound that is selected from among phosphoric acid group-contain-
(Continued)

ing compounds, boric acid group-containing compounds and silicic acid group-containing compounds.

20 Claims, 4 Drawing Sheets

(51) Int. Cl.
  C08K 3/32      (2006.01)
  C09J 7/25      (2018.01)
  C09J 133/08    (2006.01)
  H01M 4/02      (2006.01)
  H01M 4/525     (2010.01)
  H01M 10/0525   (2010.01)
  H01M 50/533    (2021.01)
  H01M 50/534    (2021.01)
  H01M 50/595    (2021.01)

(52) U.S. Cl.
  CPC ..... *H01M 10/0525* (2013.01); *H01M 50/533* (2021.01); *H01M 50/534* (2021.01); *H01M 50/595* (2021.01); *C08K 2003/2227* (2013.01); *C08K 2003/324* (2013.01); *H01M 2004/027* (2013.01); *H01M 2004/028* (2013.01)

(58) Field of Classification Search
  USPC .......................................................... 429/65
  See application file for complete search history.

(56) References Cited

U.S. PATENT DOCUMENTS

| 2014/0120417 | A1 | 5/2014 | Matsushita et al. | |
| 2016/0326401 | A1* | 11/2016 | Ikebata | C09J 7/22 |
| 2018/0131034 | A1 | 5/2018 | Oura et al. | |
| 2018/0159136 | A1 | 6/2018 | Shiozaki et al. | |
| 2018/0254505 | A1* | 9/2018 | Kang | H01M 50/595 |
| 2019/0300758 | A1* | 10/2019 | Kawazoe | C09J 7/21 |
| 2020/0303782 | A1 | 9/2020 | Yatomi | |

FOREIGN PATENT DOCUMENTS

| CN | 107710460 A | | 2/2018 | | |
| JP | 2013152870 A | * | 8/2013 | | |
| JP | 2014-5465 A | | 1/2014 | | |
| JP | 2014-89856 A | | 5/2014 | | |
| JP | 2018-83904 A | | 5/2018 | | |
| KR | 2017061591 A | * | 6/2017 | ............ | H01M 10/04 |
| WO | 2017/038010 A1 | | 3/2017 | | |
| WO | 2017/163932 A1 | | 9/2017 | | |
| WO | WO-2018117262 A1 | * | 6/2018 | ............ | B32B 27/00 |

OTHER PUBLICATIONS

English Translation of Chinese Search Report dated Aug. 12, 2022, issued in counterpart CN application No. 201980068135.2. (3 pages).

\* cited by examiner

PROTECTIVE TAPE FOR POSITIVE ELECTRODE LEAD INCLUDING ADHESIVE LAYER HAVING HEAT RESISTANT FILLER, AND BATTERY INCLUDING THE SAME

TECHNICAL FIELD

The present invention relates to a battery and a protective tape for a battery.

BACKGROUND ART

A battery in which a positive electrode lead connected to a positive electrode is covered with a protective tape to improve insulation properties between the positive electrode lead and a negative electrode has been conventionally proposed (for example, see PATENT LITERATURE 1 and PATENT LITERATURE 2).

FIG. 4 is a configuration diagram of a positive electrode of a lithium ion secondary battery described in PATENT LITERATURE 1, FIG. 4(A) is a partial top view observed from the side of one principal surface of a current collector, and FIG. 4(B) is a cross-sectional view along the line L1-L1 in FIG. 4(A).

As shown in FIG. 4, an insulation tape 44 disposed on the side of the one principal surface of a positive electrode current collector 40A covers a positive electrode current collector exposed surface 40a of a double-side uncoated part 40b on which a positive electrode mixture layer 40B is not formed, a positive electrode lead 42 on the positive electrode current collector exposed surface 40a, and a protective layer 46 interposed between a lower end part of the positive electrode lead 42 and the positive electrode current collector exposed surface 40a. This insulation tape 44 is a protective tape, and an internal short circuit between the positive electrode lead and a negative electrode can be prevented by the insulation tape 44 (protective tape) when a separator between the positive electrode and the negative electrode melts or tears at the time of abnormality of the battery, for example.

CITATION LIST

Patent Literature

PATENT LITERATURE 1: Japanese Unexamined Patent Application Publication No. 2014-89856
PATENT LITERATURE 2: International Publication No. WO 2017/038010

SUMMARY

Incidentally, when a foreign matter entering the inside of a battery penetrates through a protective tape, and an internal short circuit occurs between a positive electrode lead and a negative electrode, the battery generates heat, and the protective tape may melt or decompose. As a result, a short-circuited part expands or the short circuit continues; consequently, heat is further generated, leading an increase in battery temperature. Therefore, a filler (a metal oxide such as alumina) for improving heat resistance is conventionally added to a protective tape in some cases.

However, in the case of a filler conventionally added to a protective tape, unless the content ratio thereof is extremely increased, the protective tape may melt or decompose due to heat generated when a foreign matter penetrates through the protective tape to cause occurrence of an internal short circuit, and an increase in battery temperature is not sufficiently suppressed in some cases. On the other hand, since when the content ratio of the filler is increased, adhesive force of the protective tape decreases, long-term reliability of the protective tape may deteriorate, for example, the protective tape peels away from the positive electrode lead. Therefore, it is desired that the content ratio of a filler in a protective tape is decreased.

Therefore, it is an advantage of the present disclosure to provide a protective tape capable of suppressing an increase in battery temperature when a foreign matter penetrates through the protective tape to cause occurrence of an internal short circuit even with a small content ratio of a filler compared with a conventional filler and to provide a battery comprising the protective tape.

A battery according to an aspect of the present disclosure is a battery having a positive electrode, a negative electrode, a positive electrode lead connected to the positive electrode, and a protective tape covering the positive electrode lead, in which the protective tape has a substrate layer and an adhesive layer provided on the substrate layer, and the adhesive layer has an adhesive and a filler including at least one of the group consisting of a phosphoric acid group-containing compound, a boric acid group-containing compound, and a silicic acid group-containing compound.

A protective tape for a battery according to an aspect of the present invention has a substrate layer and an adhesive layer provided on the substrate layer, in which the adhesive layer has an adhesive and a filler including at least one of the group consisting of a phosphoric acid group-containing compound, a boric acid group-containing compound, and a silicic acid group-containing compound.

According to the present disclosure, an increase in battery temperature occurring when a foreign matter penetrates through the protective tape to cause occurrence of an internal short circuit may be suppressed even with a small content ratio of the filler compared with a conventional filler.

DESCRIPTION OF EMBODIMENT

Figure 1:
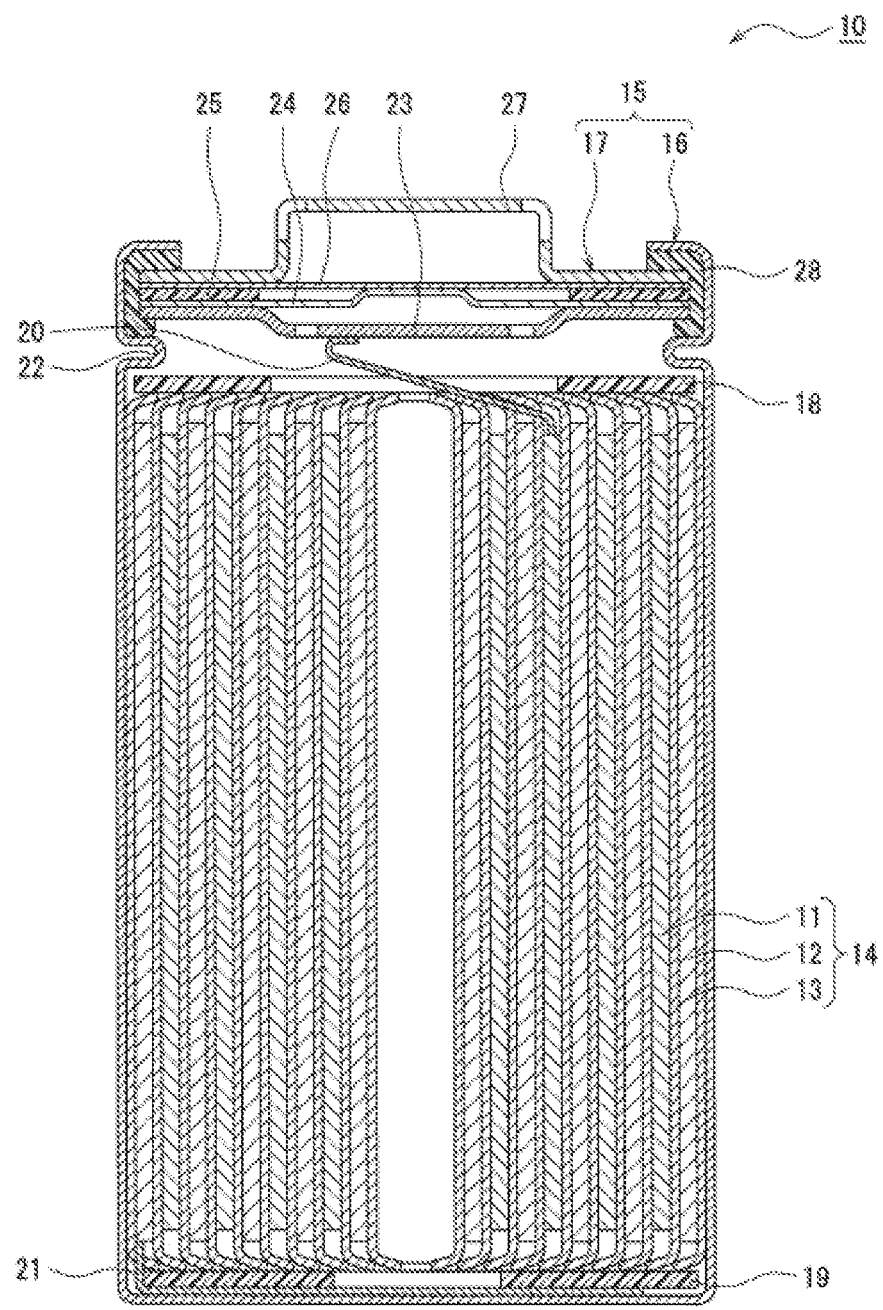
FIG. 1 is a cross-sectional view of a battery according to an embodiment.

Hereinafter, an example of a battery, which is one aspect of the present disclosure, will be described. The drawings referred to in description of the following embodiment are schematically described, and dimension ratios and the like of components depicted in the drawings may differ from actual products.

FIG. 1 is a cross-sectional view of a battery according to an embodiment. While the battery 10 shown in FIG. 1 shows an example of a lithium ion secondary battery, the battery according to the embodiment is not limited to a lithium ion secondary battery and may be a metal lithium secondary battery, an all-solid battery, or the like. Hereinafter, the battery 10 in FIG. 1 is referred to as the lithium ion secondary battery 10.

The lithium ion secondary battery 10 shown in FIG. 1 comprises a winding-type electrode assembly 14 in which a positive electrode 11 and a negative electrode 12 are wound with a separator 13 interposed therebetween; a non-aqueous electrolyte; insulating plates 18, 19 respectively disposed above and below the electrode assembly 14; a positive electrode lead 20 and a negative electrode lead 21; a protective tape (not shown) covering the positive electrode lead 20; and a battery case 15.

The electrode assembly 14 is not limited to a winding-type electrode assembly, and other forms such as a layered-type electrode assembly in which a positive electrode and a negative electrode are alternatively layered with a separator interposed therebetween may be applied, for example.

The battery case 15 accommodates the electrode assembly 14, non-aqueous electrolyte, and the like and comprises a bottomed cylindrical case body 16 having an opening and a sealing assembly 17 sealing the opening of the case body 16, for example. The battery case 15 desirably comprises a gasket 28 provided between the case body 16 and the sealing assembly 17, and sealability inside the battery is ensured thereby. The battery case 15 is not limited to one having a cylindrical shape and may be a square battery case, layered-type battery case, or the like, for example.

The case body 16 has a projecting portion 22 supporting the sealing assembly 17, a part of a side face projecting inward to form the projecting portion 22, for example. It is preferable that the projecting portion 22 is circularly formed along the circumferential direction of the case body 16, and the projecting portion 22 supports, with the upper face thereof, the sealing assembly 17.

The sealing assembly 17 has a structure in which a filter 23, a lower vent member 24, an insulator 25, an upper vent member 26, and a cap 27 are layered in this order from the electrode assembly 14 side. Each member constituting the sealing assembly 17 has, for example, a disc shape or a ring shape, and the members except for the insulator 25 are electrically connected to each other. The lower vent member 24 and the upper vent member 26 are connected to each other at their respective central parts, and the insulator 25 is interposed between respective peripheral parts. When the internal pressure increases due to heat generated by an internal short circuit or the like, the lower vent member 24 deforms so as to push the upper vent member 26 up toward the cap 27 side and breaks, and the current pathway between the lower vent member 24 and the upper vent member 26 is cut off, for example. When the internal pressure further increases, the upper vent member 26 breaks, and gas is discharged from an opening of the cap 27.

One end of the positive electrode lead 20 is connected to the positive electrode 11. In addition, the positive electrode lead 20 extends to the filter 23 through a through hole of the insulating plate 18 from the positive electrode 11, and the other end of the positive electrode lead 20 is connected to the lower face of the filter 23. Consequently, the cap 27 electrically connected to the filter 23 becomes a positive electrode terminal. In addition, one end of the negative electrode lead 21 is connected to the negative electrode 12. In addition, the negative electrode lead 21 extends to the internal face of a bottom part of the case body 16 through the outside of the insulating plate 19 from the negative electrode 12, and the other end of the negative electrode lead 21 is connected to the internal face of the bottom part of the case body 16. Consequently, the case body 16 becomes a negative electrode terminal.

Hereinafter, the positive electrode 11 and the protective tape according to the present embodiment covering the positive electrode lead 20 will be described.

Figure 2A:
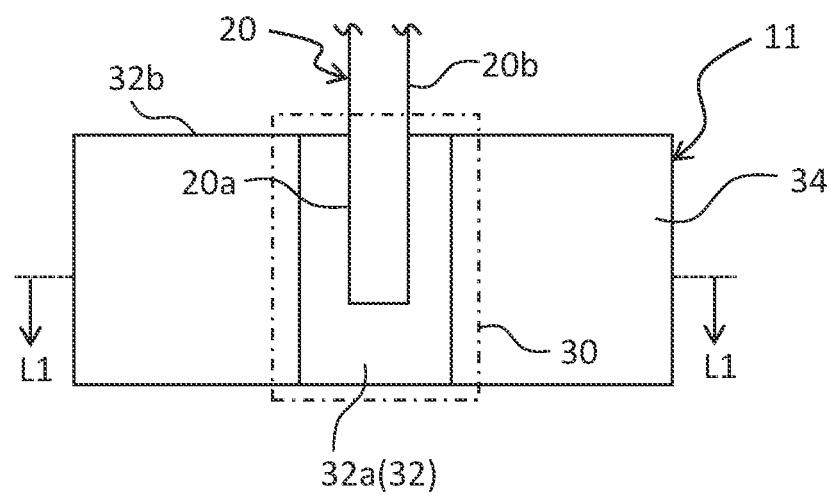
FIG. 2(A) is a partial top view observed from the side of one principal surface of a positive electrode.
Figure 2B:
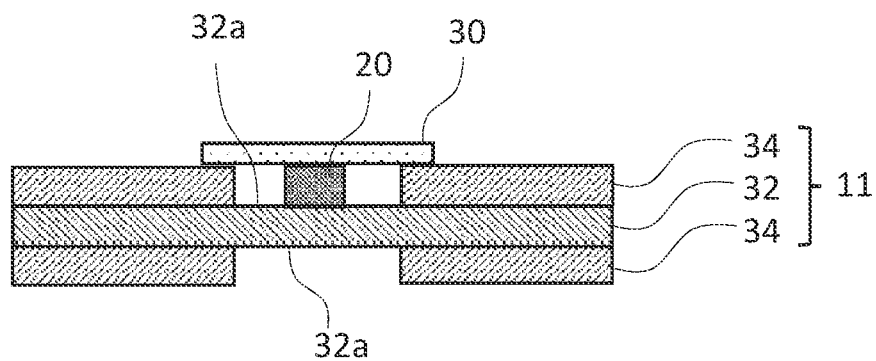
FIG. 2(B) is a cross-sectional view along the line L1-L1 in FIG. 2(A).

FIG. 2(A) is a partial top view observed from the side of one principal surface of the positive electrode, and FIG. 2(B) is a cross-sectional view along the line L1-L1 in FIG. 2(A). Incidentally, in FIG. 2, in order to clarify the configuration of the positive electrode 11, the protective tape (sign 30) covering the positive electrode lead 20 is shown, as a transparent illustration, by a dashed-dotted line in FIG. 2(A).

The positive electrode 11 comprises a positive electrode current collector 32 and a positive electrode active material layer 34 formed on the positive electrode current collector 32. Foil of a metal (e.g. aluminum) which is stable within a potential range of the positive electrode, a film with said metal disposed on the surface layer thereof, or the like is used for the positive electrode current collector 32. The positive electrode active material layer 34 includes a positive electrode active material. In addition, the positive electrode active material layer 34 preferably includes a conductive agent and a binder in addition to the positive electrode active material.

Examples of the positive electrode active material included in the positive electrode active material layer 34 include a lithium transition metal composite oxide, and the like. Specifically, lithium cobalt oxide, lithium manganese oxide, lithium nickel oxide, lithium nickel manganese composite oxide, lithium nickel cobalt composite oxide, and the like can be used, and Al, Ti, Zr, Nb, B, W, Mg, Mo, and the like may be added to these lithium transition metal composite oxides.

Examples of the conductive agent included in the positive electrode active material layer 34 include carbon powder and the like of carbon black, acetylene black, graphite, and the like. These may be independently used, or two or more thereof may be used in combination.

Examples of the binder included in the positive electrode active material layer 34 include a fluoropolymer, a rubber polymer, and the like. For example, the fluoropolymer includes polytetrafluoroethylene (PTFE), polyvinylidene difluoride (PVdF), or a modified product thereof, and the like, and the rubber polymer includes an ethylene-propylene-isoprene copolymer, an ethylene-propylene-butadiene copolymer, and the like. These may be independently used, or two or more thereof may be used in combination.

The positive electrode current collector 32 has an exposed part 32*a* on which the positive electrode active material layer 34 is not formed. Incidentally, the exposed part 32*a* shown in FIG. 2 is formed on both sides of one principal surface and the other principal surface of the positive electrode current collector 32. The exposed part 32*a* may be formed at any position of the positive electrode current collector 32 but is usually formed at the central side in the longitudinal direction of the positive electrode current collector 32.

The positive electrode lead 20 comprises one end part 20*a* connected to the exposed part 32*a* of the positive electrode current collector 32 and an extending part 20*b* extending to the outside of a peripheral part 32*b* of the positive electrode current collector 32. In addition, while not shown in FIG. 2, the positive electrode lead 20 has the other end part on the tip side from the extending part 20*b*, and the other end part is connected to the filter 23 of the sealing assembly 17 as already described. A method for connecting the one end part 20*a* of the positive electrode lead 20 and the exposed part 32*a* of the positive electrode current collector 32 is not particularly limited as long as electrical connection between the positive electrode lead 20 and the positive electrode current collector 32 is secured, and examples thereof include ultrasonic welding, and the like.

Material for the positive electrode lead 20 is not particularly limited and includes metals such as aluminum and titanium, and the like.

The protective tape 30 shown in FIG. 2 covers the one end part 20a of the positive electrode lead 20. That is, the protective tape 30 covers the positive electrode lead 20 positioned on the exposed part 32a of the positive electrode current collector 32. However, the position of the positive electrode lead 20 covered with the protective tape 30 is not limited to the one end part 20a of the positive electrode lead 20 and may be the extending part 20b of the positive electrode lead 20 or may be the other end part, which is a part connected to the sealing assembly 17, of the positive electrode lead 20, for example. An internal short circuit occurring between the positive electrode lead 20 and the negative electrode 12 is likely to occur mainly between the one end part 20a of the positive electrode lead 20 and the negative electrode 12 and between the extending part 20b of the positive electrode lead 20 and the negative electrode 12. Therefore, the protective tape 30 preferably covers at least any one of the one end part 20a and extending part 20b of the positive electrode lead 20 and especially preferably covers the one end part 20a of the positive electrode lead 20. Incidentally, when the one end part 20a of the positive electrode lead 20 is covered with the protective tape 30, the protective tape 30 may cover a part of the one end part 20a of the positive electrode lead 20 but preferably covers the whole of the one end part 20a from the point of, for example, effectively suppressing occurrence of an internal short circuit. In addition, the same applies to the case where the extending part 20b of the positive electrode lead 20 is covered with the protective tape 30, the protective tape 30 may cover a part of the extending part 20b but preferably covers the whole of the extending part 20b. In addition, when a part or the whole of the extending part 20b of the positive electrode lead 20 is covered with the protective tape 30, it is preferable that the protective tape 30 is wound around the extending part 20b to cover the whole of the outer periphery of the extending part 20b.

In addition, as shown in FIG. 2, the protective tape 30 may cover the exposed part 32a of the positive electrode current collector 32 in addition to covering the one end part 20a of the positive electrode lead 20. When the exposed part 32a is covered with the protective tape 30, the protective tape 30 may cover a part of the exposed part 32a but preferably covers the whole of the exposed part 32a from the point of, for example, effectively suppressing occurrence of an internal short circuit. Incidentally, while the protective tape 30 and the exposed part 32a are shown as if there is a space (distance) therebetween in FIG. 2, the protective tape 30 may adhere to the exposed part 32a. As shown in FIG. 2, the protective tape 30 may be positioned on the positive electrode active material layer 34 protruding from the exposed part 32a.

Hereinafter, a configuration of the protective tape 30 will be described.

Figure 3:
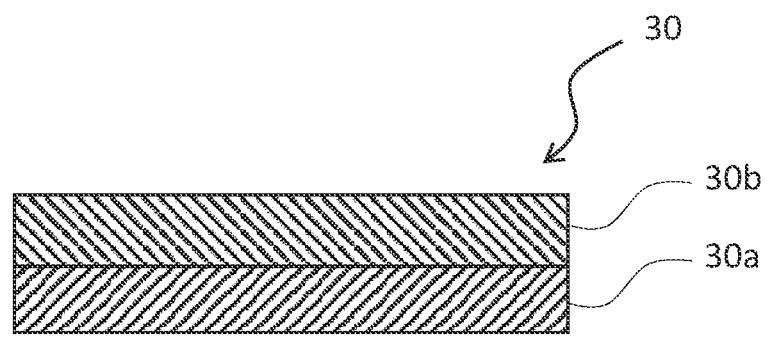
FIG. 3 is a partial cross-sectional view of a protective tape used in the present embodiment.
Figure 4:
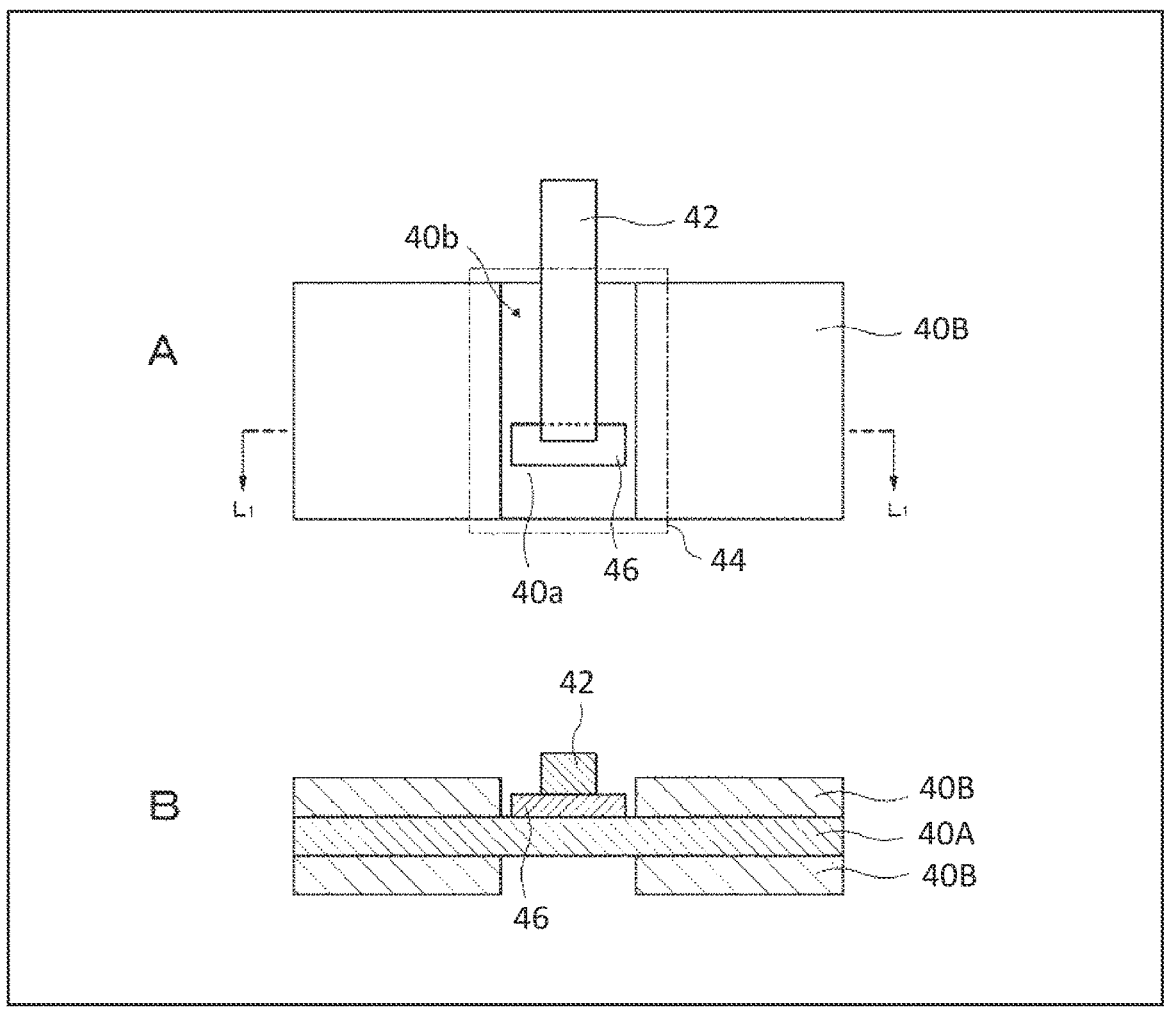
FIG. 4 is a configuration diagram of a positive electrode of a lithium ion secondary battery described in PATENT LITERATURE 1.

FIG. 3 is a partial cross-sectional view of a protective tape used in the present embodiment. As shown in FIG. 3, the protective tape 30 has an adhesive layer 30a and a substrate layer 30b. The adhesive layer 30a of the protective tape 30 is a layer adhering to the positive electrode lead 20. That is, the protective tape 30 has a layered layer structure in which the adhesive layer 30a and the substrate layer 30b are layered in this order from the positive electrode lead 20 side.

The substrate layer 30b is desirably a layer mainly containing organic material from the points of heat resistance, mechanical strength, and the like. The phrase "mainly containing organic material" means that the proportion of organic material is highest among materials constituting the substrate layer 30b, and from the point of, for example, strength of the protective tape 30, a content of organic material is preferably 80% by mass or more and more preferably 90% by mass or more based on the total mass of the substrate layer 30b, for example. Examples of the organic material include a cellulose derivative (for example, a cellulose ether, a cellulose ester, and the like), a polyvinyl chloride, a polyolefin (for example, polyethylene, polypropylene, and the like), a polystyrene, a polyester (for example, polyethylene terephthalate, and the like), a polyimide, a polyamide, a polyamideimide, a polycarbonate, a polyphenylene sulfide, and the like. Among these, a polyimide and a wholly aromatic polyamide (aramid) are preferable, and a polyimide is especially preferable. These may be independently used, or two or more thereof may be used in combination. In addition, the substrate layer 30b may have a layered structure including a first resin layer and a second resin layer, and examples thereof include a layered structure including a first resin layer including a polyimide and a second resin layer including a resin other than polyimides. When the substrate layer 30b includes a polyimide, a content of the polyimide is preferably 80% by mass or more and more preferably 90% by mass or more.

The term polyimide is a collective term of polymers including an imide bond in a repeating unit thereof and usually means an aromatic polyimide in which aromatic compounds directly binds through imide binding. Aromatic polyimides have a conjugate structure in which an imide bond intervenes between aromatic rings and therefore are rigid and have a strong molecular structure. The type of polyimide is not particularly limited and may be a wholly aromatic polyimide such as polypyromellitimide, may be a semi-aromatic polyimide such as polyetherimide, or may be a thermosetting polyimide obtained through reaction of a bismaleimide and an aromatic diamine.

The thickness of the substrate layer 30b is arbitrary but is preferably 5 μm or more and 30 μm or less and more preferably 10 μm or more and 30 μm or less, for example, from the point of, for example, strength of the protective tape 30.

Incidentally, although the substrate layer 30b is not limited to one not including a filler such as inorganic material, it is preferable that the protective tape 30 includes a filler as less as possible from the point of, for example, flexibility of the protective tape 30.

The adhesive layer 30a includes an adhesive and a filler. The adhesive is not particularly limited as long as it is material having adhesiveness against an adhesion part of the positive electrode lead 20 and the like, and examples thereof include acrylic resin, natural rubber, synthetic rubber, silicone, epoxy resin, melamine resin, phenolic resin, and the like. These may be independently used, or two or more thereof may be used in combination. In addition, the binder may include a solvent and an additive such as a tackifier, a crosslinking agent, an antiaging agent, a colorant, an antioxidant, a chain transfer agent, a plasticizer, a softener, a surfactant, and an antistatic agent in addition to resin material as needed.

The filler includes at least one of the group consisting of a phosphoric acid group-containing compound, a boric acid group-containing compound, and a silicic acid group-containing compound.

The phosphoric acid group-containing compound is not particularly limited as long as it is a compound having a phosphoric acid group but is preferably a phosphoric acid-metal salt, a phosphoric acid ester, a condensed phosphoric acid salt, or the like, for example. These may be independently used, or two or more thereof may be used in combination.

As the metal species in the phosphoric acid-metal salt, an alkali metal, an alkaline earth metal, a transition metal, Al, and the like are preferable, for example, lithium, sodium, magnesium, potassium, and calcium are especially preferable, and lithium and potassium are more preferable. Specific examples of the phosphoric acid-metal salt include phosphoric acid-lithium salts such as lithium phosphate, dilithium phosphate, trilithium phosphate, lithium hydrogen phosphate, lithium dihydrogen phosphate, and dilithium hydrogen phosphate; phosphoric acid-sodium salts such as sodium phosphate, disodium phosphate, trisodium phosphate, sodium dihydrogen phosphate, and disodium hydrogen phosphate; phosphoric acid-magnesium salts such as magnesium hydrogen phosphate and trimagnesium phosphate; phosphoric acid-potassium salts such as potassium dihydrogen phosphate, dipotassium hydrogen phosphate, and tripotassium phosphate; phosphoric acid-calcium salts such as calcium dihydrogen phosphate, calcium hydrogen phosphate, and tricalcium phosphate; and the like, and aluminum phosphate, for example.

Examples of the phosphoric acid ester include aliphatic phosphoric acid esters such as trimethyl phosphate, triethyl phosphate, and tributyl phosphate; aromatic phosphoric acid esters such as triphenyl phosphate, cresyl diphenyl phosphate, dicresyl phenyl phosphate, tricresyl phosphate, trixylenyl phosphate, xylenyl diphenyl phosphate, tris(isopropylphenyl) phosphate, isopropylphenyl diphenyl phosphate, diisopropylphenyl phenyl phosphate, tris(trimethylphenyl) phosphate, tris(t-butylphenyl) phosphate, hydroxyphenyl diphenyl phosphate, and octyl diphenyl phosphate; condensed phosphoric acid esters such as resorcinol polyphenyl phosphate, 1,3-phenylene bis(2,6-dimethylphenyl phosphate), resorcinol poly(di-2,6-xylyl) phosphate, bisphenol A polycresyl phosphate, bisphenol A polyphenyl phosphate, hydroquinone poly(2,6-xylyl) phosphate, and condensates thereof; and the like.

Examples of the condensed phosphoric acid salt include polyphosphates such as pyrophosphates and tripolyphosphates, metaphosphates such as trimetaphosphates and tetrametaphosphates, ultraphosphates, and the like. Specifically, ammonium polyphosphate, piperazine polyphosphate, melamine polyphosphate, guanidine polyphosphate, ammonium polyphosphate amide, sodium polyphosphate, potassium polyphosphate, aluminum polyphosphate, and the like are exemplified.

The boric acid group-containing compound is not particularly limited as long as it is a compound having a boric acid group but is preferably a boric acid-metal salt, a boric acid ester, a condensed boric acid salt, or the like, for example. These may be independently used, or two or more thereof may be used in combination.

As the metal species in the boric acid-metal salt, an alkali metal, an alkaline earth metal, a transition metal, Al, and the like are preferable, for example, specifically, lithium, sodium, magnesium, potassium, and calcium are preferable, and lithium and calcium are more preferable. Specific examples of the boric acid-metal salt include boric acid-lithium salts such as lithium metaborate, lithium tetraborate, and lithium pentaborate; boric acid-sodium salts such as sodium metaborate, sodium diborate, sodium tetraborate, sodium pentaborate, sodium hexaborate, and sodium octaborte; boric acid-magnesium salts such as magnesium orthoborate, magnesium diborate, magnesium metaborate, trimagnesium tetraborate, and pentamagnesium tetraborate; boric acid-potassium salts such as potassium metaborate, potassium tetraborate, potassium pentaborate, potassium hexaborate, and potassium octaborate; boric acid-calcium salts such as calcium diborate, tricalcium tetraborate, pentacalcium tetraborate, and calcium hexaborate; and the like, and aluminum borate, for example.

Examples of the boric acid ester include aliphatic boric acid esters such as trimethyl borate, triethyl borate, tripropyl borate, and tributyl borate; aromatic boric acid esters such as tricresyl borate and triphenyl borate; and the like.

Examples of the condensed boric acid salt include melamine borates such as anhydrous melamine borate and melamine tetraborate.

The silicic acid group-containing compound is preferably a silicic acid-metal salt, a silicic acid ester, and a condensed silicic acid salt and includes silicic acid-lithium salts, silicic acid-sodium salts, silicic acid-potassium salts, silicic acid-calcium salts, silicic acid-magnesium salts, silicic acid-barium salts, and silicic acid-manganese salts. Examples thereof include lithium metasilicate, sodium metasilicate, potassium metasilicate, magnesium metasilicate, calcium metasilicate, barium metasilicate, manganese metasilicate, and the like.

The phosphoric acid group-containing compound, boric acid group-containing compound, and silicic acid group-containing compound have flame retardant properties, and heat resistance of the protective tape 30 can be improved by adding these compounds to the adhesive layer 30a. For example, melting or decomposition of the protective tape 30 is suppressed even when a foreign matter penetrates through the protective tape 30, an internal short circuit occurs between the positive electrode lead 20 and the negative electrode 12, and the battery generates heat. As a result, expansion of a short-circuited part or continuation of the short circuit is suppressed, and an increase in battery temperature is suppressed. In addition, the phosphoric acid group-containing compound, boric acid group-containing compound, and silicic acid group-containing compound can bring heat resistance of the protective tape 30 to an equal or higher level with a smaller content ratio compared with the case of a conventional filler (metal oxide such as alumina). That is, an increase in battery temperature caused when a foreign matter penetrates through the protective tape 30, and a short circuit occurs can be suppressed with a smaller content ratio compared with the case of a conventional filler. Furthermore, in the present embodiment, the content ratio of the filer (phosphoric acid group-containing compound, boric acid group-containing compound, and silicic acid group-containing compound) can be kept lower than a conventional filler. Therefore, it is also made possible to improve adhesive force of the protective tape 30 (adhesive force of the adhesive layer 30a in practice). As a result, deterioration of long-term reliability of the protective tape 30 such as peeling of the protective tape 30 from the positive electrode lead 20 can be suppressed, and long-term safety of the battery can be consequently ensured.

The content of the filler in the adhesive layer 30a is preferably within a range of 1 mass % to 50 mass %, for example, and more preferably within a range of 1 mass % to 30 mass % from the points of, for example, heat resistance and adhesive force of the protective tape 30.

The thickness of the adhesive layer 30a is arbitrary but is preferably within a range of 1 μm to 25 μm, for example, and more preferably within a range of 5 μm to 20 μm from the points of, for example, adhesiveness of the protective tape 30 and effectively suppressing melting or decomposition of the protective tape 30.

The adhesive layer 30a preferably includes a foaming accelerator in addition to the adhesive and the filler. The foaming accelerator has a function of releasing gas components such as nitrogen gas and ammonia gas through decomposition due to heat, and examples thereof include nitrogen-containing compounds such as a decomposable ammonium salt, dicyandiamide, and melamine. When the foaming accelerator is included, a foamable heat insulation layer is formed at the time of decomposition due to heat, and expansion of heat decomposition into the surroundings and continuation of heat generation can be consequently suppressed. As a result, the same effect can be achieved with use of a smaller amount of the filler compared with the case where the foaming accelerator is not included.

The thickness of the protective tape 30 is not particularly limited but is preferably within a range of 10 to 55 μm, for example. When the thickness of the protective tape 30 is less than 10 μm, breakage is likely to occur due to a foreign matter entering the inside of the battery. In addition, when the thickness of the protective tape 30 exceeds 55 μm, the volume of another component may be required to be reduced so as to accommodate the electrode assembly 14 in the case body 16 having a predetermined size.

Since an increase in battery temperature due to an internal short circuit of the battery is likely to occur mainly at the time when the positive electrode lead 20 and the negative electrode 12 contact, as exemplified above, it is preferable that the protective tape 30 covers the positive electrode lead 20 (and the exposed part 32a of the positive electrode current collector 32). However, the part covered with the protective tape 30 is not limited to the positive electrode lead 20 (and the exposed part 32a of the positive electrode current collector 32) and is not particularly limited as long as it is a part at which battery temperature may increase due to an internal short circuit of the battery. For example, as with the case of the positive electrode 11, an exposed part of a negative electrode current collector is usually formed in the negative electrode 12, and one end of the negative electrode lead 21 is connected onto the exposed part. In this case, the protective tape 30 may cover the negative electrode lead 21 and the exposed part of the negative electrode current collector.

Hereinafter, the negative electrode 12, non-aqueous electrolyte and separator 13 will be described.

The negative electrode 12 comprises a negative electrode current collector and a negative electrode active material layer formed on the negative electrode current collector. Foil of a metal (e.g. copper) which is stable within a potential range of the negative electrode, a film with said metal disposed on the surface layer thereof or the like can be used for the negative electrode current collector. The negative electrode active material layer includes a negative electrode active material. The negative electrode active material layer preferably includes a thickener and a binder in addition to the negative electrode active material.

Carbon material capable of storing and releasing a lithium ion can be used as the negative electrode active material, and hardly graphitizable carbon, easily graphitizable carbon, fibrous carbon, coke, carbon black, and the like can be used besides graphite. Furthermore, silicon, tin, and an alloy and oxide mainly containing them can be used as a non-carbon-based material.

As the binder, while PTFE and the like can be used as with the case of the positive electrode, a styrene-butadiene copolymer (SBR) or a modified product thereof and the like may be used. As the thickener, carboxymethyl cellulose (CMC) and the like can be used.

While description with reference to a drawing is omitted, the negative electrode current collector has an exposed part on which the negative electrode active material layer is not formed as with the case of the positive electrode current collector 32 already described. Incidentally, the exposed part of the negative electrode current collector may be formed at any position of the negative electrode current collector but is usually formed at the end part side in the longitudinal direction of the negative electrode current collector. In addition, the negative electrode lead 21 comprises one end part connected to the exposed part of the negative electrode current collector and an extending part extending to the outside of a peripheral part of the negative electrode current collector from the one end part as with the case of the positive electrode lead 20 already described. In addition, the negative electrode lead 21 has the other end part on the tip side from the extending part, and the other end part is connected to the internal face of the bottom part of the case body 16. Material for the negative electrode lead 21 is not particularly limited and includes a metal such as nickel and titanium, and the like.

The protective tape 30 may cover at least any one of the one end part, extending part, and other end part of the negative electrode lead 21. The protective tape 30 may also cover the exposed part of the negative current collector.

The non-aqueous electrolyte includes a non-aqueous solvent and an electrolyte salt dissolved in the non-aqueous solvent. The non-aqueous electrolyte is not limited to a liquid electrolyte and may be a solid electrolyte using a gelatinous polymer or the like. Esters, ethers, nitriles, amides such as dimethylformamide, isocyanates such as hexamethylene diisocyanate, a mixed solvent of two or more thereof, and the like can be used as the non-aqueous solvent, for example. The non-aqueous solvent may contain a halogen-substituted product in which at least a part of hydrogen of these solvents is substituted with a halogen atom such as fluorine.

Examples of the above-described esters include cyclic carbonic acid esters such as ethylene carbonate (EC), propylene carbonate (PC), and butylene carbonate; linear carbonic acid esters such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylic acid esters such as γ-butyrolactone and γ-valerolactone; linear carboxylic acid esters such as methyl acetate, ethyl acetate, propyl acetate, methyl propionate (MP), and ethyl propionate; and the like.

Examples of the above-described ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methyl furan, 1,8-cineole, and a crown ether; linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1- dimethoxymethane, 1,1-diethoxyethane, triethylene glycol dimethyl ether, and tetraethylene glycol dimethyl; and the like.

Examples of the above-described nitriles include acetonitrile, propionitrile, butyronitrile, valeronitrile, n-heptanitrile, succinonitrile, glutaronitrile, adiponitrile, pimelonitrile, 1,2,3-propanetricarbonitrile, 1,3,5-pentanetricarbonitrile, and the like.

Examples of the above-described halogen-substituted product include fluorinated cyclic carbonic acid esters such as fluoroethylene carbonate (FEC), fluorinated linear carbonic acid esters, fluorinated linear carboxylic acid esters such as fluoromethyl propionate (FMP), and the like.

Examples of the electrolyte salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, a lower aliphatic carboxylic acid lithium, borate salts such as $Li_2B_4O_7$ and $Li(B(C_2O_4)F_2)$, imide salts such as $LiN(SO_2CF_3)_2$ and $LiN(C_lF_{2l+1}SO_2)(C_mF_{2m+1}SO_2)$ {l and m are an integer of 0 or more}, and the like. One kind of these electrolyte salts may be used alone, or a mixture of plural thereof may be used. A concentration of the electrolyte salt is 0.8 to 1.8 moles per 1 L of the non-aqueous solvent, for example.

A porous sheet having ion permeability and insulation properties is used for the separator 13, for example. Specific examples of the porous sheet include a fine porous thin film, woven fabric, nonwoven fabric, and the like. As material of the separator 13, olefin-based resin such as polyethylene and polypropylene and cellulose are preferable. The separator 13 may be a layered body having a cellulose fiber layer and a fiber layer of thermoplastic resin such as olefin-based resin. In addition, the separator 13 may be a multilayer separator including a polyethylene layer and a polypropylene layer, and a separator in which a material such as an aramid-based resin and a ceramic is applied to a surface thereof may be used.

EXAMPLES

Hereinafter, the present disclosure will be further described by giving Examples. However, the present disclosure is not limited to these examples.

Example 1

[Production of Positive Electrode]

Positive electrode mixture slurry was prepared by mixing 100 parts by mass of $LiNi_{0.82}Co_{0.15}Al_{0.03}O_2$, which was a positive electrode active material, 1.0 part by mass of acetylene black (conductive agent), 0.9 parts by mass of polyvinylidene difluoride (binder), and an appropriate amount of NMP. The obtained positive electrode mixture shun was applied to both sides of aluminum foil having a thickness of 15 μm, which would be a positive electrode current collector, followed by drying and rolling to produce a strip-shaped positive electrode. Provided that slit-like exposed parts were provided on both sides of the positive electrode near the center in the longitudinal direction. One end part of a positive electrode lead was disposed on the exposed part of the positive electrode current collector, and the one end part and the exposed part were welded.

A protective tape was attached so that the one end part of the positive electrode lead and the whole surface of the exposed part of the positive electrode current collector were covered. The protective tape used was a protective tape having a substrate layer of a polyimide having a thickness of 25 μm and an adhesive layer having a thickness of 7 μm. The polyimide was synthesized by reaction of pyromellitic anhydride and diaminodiphenyl ether. A mixture of 75 parts by mass of an acrylic adhesive containing acrylic resin as a main component and 25 parts by mass of $Li_3PO_4$ particles (manufactured by Sigma-Aldrich Japan), which was a filler, was used as the adhesive layer.

[Production of Negative Electrode]

Negative electrode mixture slurry was prepared by mixing 100 parts by mass of scaly artificial graphite having an average particle diameter of about 20 μm, which was a negative electrode active material, one part by mass of styrene-butadiene rubber (binder), one part by mass of carboxymethyl cellulose (thickener), and water. The obtained negative electrode mixture slurry was uniformly applied to both sides of copper foil having a thickness of 8 μm, which would be a negative electrode current collector, followed by drying and rolling to produce a strip-shaped negative electrode. Provided that exposed parts were provided on both sides of the end part of the negative electrode at the winding end side. One end part of a negative electrode lead was disposed on the exposed part of the negative electrode current collector, and the one end part and the exposed part were welded.

[Preparation of Non-Aqueous Electrolyte]

$LiPF_6$ was dissolved in a mixed solvent of ethylene carbonate, ethyl methyl carbonate, and dimethyl carbonate (volume ratio of 1:1:8) so as to achieve a concentration of 1.4 mol/L to prepare a non-aqueous electrolyte.

[Production of Battery]

The positive electrode and the negative electrode were layered with a separator interposed therebetween and wound to form an electrode assembly. After insulating plates were disposed on the top and bottom of this electrode assembly, this electrode assembly was accommodated in an iron case body with the internal surface thereof plated with nickel. The negative electrode lead projecting from the electrode assembly and the bottom face of the battery case were welded, and the positive electrode lead projecting from the electrode assembly and the internal face of a sealing assembly provided with a gasket at the peripheral part thereof were welded. After the non-aqueous electrolyte was injected into the inside of the case body, the opening of the case body was closed by the sealing assembly, and the end part of the opening of the case body was crimped with the peripheral part of the sealing assembly via the gasket to produce a cylindrical lithium ion secondary battery.

Example 2

A lithium ion secondary battery was produced in the same manner as in Example 1 except that a mixture of 70 parts by mass of an acrylic adhesive containing acrylic resin as a main component and 30 parts by mass of $Li_3PO_4$ particles, which were a filler, was used as the adhesive layer of the protective tape.

Example 3

A lithium ion secondary battery was produced in the same manner as in Example 1 except that a mixture of 50 parts by mass of an acrylic adhesive containing acrylic resin as a main component and 50 parts by mass of $Li_3PO_4$ particles, which were a filler, was used as the adhesive layer of the protective tape.

Example 4

A lithium ion secondary battery was produced in the same manner as in Example 1 except that a mixture of 75 parts by mass of an acrylic adhesive containing acrylic resin as a main component and 25 parts by mass of calcium phosphate particles (manufactured by Wako Pure Chemical Industries, Ltd.), which were a filler, was used as the adhesive layer of the protective tape.

Example 5

A lithium ion secondary battery was produced in the same manner as in Example 1 except that a mixture of 70 parts by mass of an acrylic adhesive containing acrylic resin as a main component and 30 parts by mass of calcium phosphate particles, which were a filler, was used as the adhesive layer of the protective tape.

Example 6

A lithium ion secondary battery was produced in the same manner as in Example 1 except that a mixture of 75 parts by mass of an acrylic adhesive containing acrylic resin as a main component and 25 parts by mass of ammonium polyphosphate particles (manufactured by TAIHEI CHEMICAL INDUSTRIAL CO., LTD.), which were a filler, was used as the adhesive layer of the protective tape.

Example 7

A lithium ion secondary battery was produced in the same manner as in Example 1 except that a mixture of 70 parts by mass of an acrylic adhesive containing acrylic resin as a main component and 30 parts by mass of ammonium polyphosphate particles, which were a filler, was used as the adhesive layer of the protective tape.

Example 8

A lithium ion secondary battery was produced in the same manner as in Example 1 except that a mixture of 75 parts by mass of an acrylic adhesive containing acrylic resin as a main component and 25 parts by mass of melamine polyphosphate particles (manufactured by SANWA CHEMICAL CO., LTD), which were a filler, was used as the adhesive layer of the protective tape.

Example 9

A lithium ion secondary battery was produced in the same manner as in Example 1 except that a mixture of 70 parts by mass of an acrylic adhesive containing acrylic resin as a main component and 30 parts by mass of melamine polyphosphate particles, which were a filler, was used as the adhesive layer of the protective tape.

Example 10

A lithium ion secondary battery was produced in the same manner as in Example 1 except that a mixture of 70 parts by mass of an acrylic adhesive containing acrylic resin as a main component and 30 parts by mass of $Li_2B_4O_7$ particles (manufactured by Wako Pure Chemical Industries, Ltd.), which were a filler, was used as the adhesive layer of the protective tape.

Example 11

A lithium ion secondary battery was produced in the same manner as in Example 1 except that a mixture of 70 parts by mass of an acrylic adhesive containing acrylic resin as a main component and 30 parts by mass of $Li_2SiO_3$ particles (manufactured by Wako Pure Chemical Industries, Ltd.), which were a filler, was used as the adhesive layer of the protective tape.

Comparative Example 1

A lithium ion secondary battery was produced in the same manner as in Example 1 except that a mixture of 75 parts by mass of an acrylic adhesive containing acrylic resin as a main component and 25 parts by mass of $Al_2O_3$ particles, which were a filler, was used for the adhesive layer.

Comparative Example 2

A lithium ion secondary battery was produced in the same manner as in Example 1 except that a mixture of 50 parts by mass of an acrylic adhesive containing acrylic resin as a main component and 50 parts by mass of $Al_2O_3$ particles, which were a filler, was used for the adhesive layer.

Comparative Example 3

A lithium ion secondary battery was produced in the same manner as in Example 1 except that a mixture of 30 parts by mass of an acrylic adhesive containing acrylic resin as a main component and 70 parts by mass of $Al_2O_3$ particles, which were a filler, was used for the adhesive layer.

[Forced Internal Short Circuit Test]

A forced internal short circuit test was conducted on each of the batteries of Examples and Comparative Examples in accordance with JIS C 8714. Provided that a severe test using a nickel small piece (height: 0.5 mm, width: 0.2 mm, L-shape with a side of 3 mm (angle: 90°)) having a larger size than a nickel small piece with a standard size was conducted. The nickel small piece was disposed between the protective tape and the separator so that the small piece penetrated through the protective tape. Then, an increase in temperature on the side surface of the battery was measured with a thermocouple. The results thereof are shown in Table 1.

[Protective Tape Adhesive Force Test]

Adhesive force (N/10 mm) of each of the protective tapes used in Examples and Comparative Examples was evaluated in accordance with 10.4.1 (180° peeling adhesive force against a test plate) of JIS Z 0237:2009. The results thereof are shown in Table 1.

TABLE 1

| | Substrate layer | Adhesive layer Adhesive | Adhesive layer Filler | Filler content ratio (wt %) | Protective tape adhesion force (N/10 mm) | Forced internal short circuit test Battery temperature increase (Δ° C.) |
|---|---|---|---|---|---|---|
| Example 1 | Polyimide | Acrylic | LiPO₄ | 25 | 0.7 | 10 |
| Example 2 | Polyimide | Acrylic | LiPO₄ | 30 | 0.6 | Without increase |
| Example 3 | Polyimide | Acrylic | LiPO₄ | 50 | 0.4 | Without increase |
| Example 4 | Polyimide | Acrylic | Calcium phosphate | 25 | 0.6 | 15 |
| Example 5 | Polyimide | Acrylic | Calcium phosphate | 30 | 0.5 | Without increase |
| Example 6 | Polyimide | Acrylic | Ammonium polyphosphate | 25 | 0.5 | <5 |
| Example 7 | Polyimide | Acrylic | Ammonium polyphosphate | 30 | 0.4 | Without increase |
| Example 8 | Polyimide | Acrylic | Melamine polyphosphate | 25 | 0.5 | <5 |
| Example 9 | Polyimide | Acrylic | Melamine polyphosphate | 30 | 0.5 | Without increase |
| Example 10 | Polyimide | Acrylic | Li₂B₄O₇ | 30 | 0.6 | Without increase |
| Example 11 | Polyimide | Acrylic | Li₂SiO₃ | 30 | 0.6 | Without increase |
| Comparative Example 1 | Polyimide | Acrylic | Al₂O₃ | 25 | 0.5 | 30 |
| Comparative Example 2 | Polyimide | Acrylic | Al₂O₃ | 50 | 0.2 | 10 |
| Comparative Example 3 | Polyimide | Acrylic | Al₂O₃ | 70 | 0.1 | Without increase |

Examples in each of which a phosphoric acid group-containing compound, boric acid group-containing compound, or silicic acid group-containing compound was used as the filler added to the protective tape and Comparative Examples in each of which $Al_2O_3$ particles were used as the filler are compared. Although the content ratio of the filler is the same, an increase in battery temperature in the forced internal short circuit tests was suppressed in Examples 1, 4, 6, and 8 compared with Comparative Example 1. In addition, in Examples 1, 2, and 5 to 11, although the content ratio of the filler was lower than that in Comparative Example 2, an increase in battery temperature in the forced internal short circuit tests was suppressed. In addition, in Examples 2, 3, 5, 7, 9, 10, and 11, although the content ratio of the filler was lower than that in Comparative Example 3, an increase in battery temperature in the forced internal short circuit tests was not observed as with the case of Comparative Example 3. In addition, as the content ratio of the filler can be reduced by using the phosphoric acid group-containing compound, boric acid group-containing compound, or silicic acid group-containing compound as the filler, it is also possible to improve adhesive force of the protective tape.

REFERENCE SIGNS LIST 10 lithium ion secondary battery
11 positive electrode
12 negative electrode
13 separator
14 electrode assembly
15 battery case
16 case body
17 sealing assembly
18, 19 insulating plate
20 positive electrode lead
20a one end part
20b extending part
21 negative electrode lead
22 projecting portion
23 filter
24 lower vent member
25 insulator
26 upper vent member
27 cap
28 gasket
30 protective tape
30a adhesive layer
30b substrate layer
32 positive electrode current collector
32a exposed part
32b peripheral part
34 positive electrode active material layer

The invention claimed is:

1. A protective tape for a battery, comprising:
a substrate layer; and
an adhesive layer provided on the substrate layer, wherein
the adhesive layer has an adhesive and a filler, wherein the filler includes at least one of the group consisting of a phosphoric acid-metal salt, and a silicic acid group-containing compound,
the phosphoric acid-metal salt includes at least one of the group consisting of a phosphoric acid-potassium salt, a phosphoric acid-calcium salt, a phosphoric acid-magnesium salt, and aluminum phosphate, and
the silicic acid group-containing compound includes at least one of the group consisting of a silicic acid ester, and a condensed silicic acid salt.

2. The protective tape for a battery according to claim 1, wherein a content ratio of the filler in the adhesive layer is within a range of 1 mass % to 50 mass %.

3. The protective tape for a battery according to claim 1, wherein a content ratio of the filler in the adhesive layer is within a range of 1 mass % to 30 mass %.

4. The protective tape for a battery according to claim 1, wherein a thickness of the adhesive layer is within a range of 5 μm to 20 μm.

5. The protective tape for a battery according to claim 1, wherein
the filler further includes a boric acid group-containing compound, and the boric acid group-containing compound includes at least one of the group consisting of a boric acid-metal salt, a boric acid ester, and a condensed boric acid salt.

6. The protective tape for a battery according to claim 1, wherein
the filler further includes a boric acid group-containing compound, and
the boric acid group-containing compound includes at least one of the group consisting of a boric acid-lithium salt, a boric acid-sodium salt, a boric acid-potassium salt, a boric acid-calcium salt, a boric acid-magnesium salt, aluminum borate, and melamine borate.

7. The protective tape for a battery according to claim 1, wherein
the silicic acid group-containing compound further includes a silicic acid-metal salt, and
the silicic acid-metal salt includes at least one of the group consisting of a silicic acid-lithium salt, a silicic acid-sodium salt, a silicic acid-potassium salt, a silicic acid-calcium salt, a silicic acid-magnesium salt, a silicic acid-barium salt, and a silicic acid-manganese salt.

8. The protective tape for a battery according to claim 1, wherein the filler further includes at least one of a phosphoric acid-sodium salt, a phosphoric acid-lithium salt, ammonium polyphosphate, and melamine polyphosphate.

9. The protective tape for a battery according to claim 1, wherein the filler includes the phosphoric acid-metal salt and the silicic acid group-containing compound.

10. The protective tape for a battery according to claim 1, wherein
the adhesive layer includes at least one of the group consisting of an ammonium salt, dicyandiamide, and melamine as a foaming accelerator, and
the foaming accelerator is decomposed by heat to release a gas component.

11. A battery, comprising:
a positive electrode;
a negative electrode;
a positive electrode lead connected to the positive electrode; and
a protective tape covering the positive electrode lead, wherein
the protective tape has a substrate layer and an adhesive layer provided on the substrate layer,
the adhesive layer has an adhesive and a filler, wherein the filler includes at least one of the group consisting of a phosphoric acid-metal salt, and a silicic acid group-containing compound;
the phosphoric acid-metal salt includes at least one of the group consisting of a phosphoric acid-potassium salt, a phosphoric acid-calcium salt, a phosphoric acid-magnesium salt, and aluminum phosphate; and
the silicic acid group-containing compound includes at least one of the group consisting of a silicic acid ester, and a condensed silicic acid salt.

12. The battery according to claim 11, wherein a content ratio of the filler in the adhesive layer is within a range of 1 mass % to 50 mass %.

13. The battery according to claim 11, wherein a content ratio of the filler in the adhesive layer is within a range of 1 mass % to 30 mass %.

14. The battery according to claim 11, wherein a thickness of the adhesive layer is within a range of 5 μm to 20 μm.

15. The battery according to claim 11, wherein
the filler further includes a boric acid group-containing compound, and
the boric acid group-containing compound includes at least one of the group consisting of a boric acid-metal salt, a boric acid ester, and a condensed boric acid salt.

16. The battery according to claim 11, wherein
the filler further includes a boric acid group-containing compound, and
the boric acid group-containing compound includes at least one of the group consisting of a boric acid-lithium salt, a boric acid-sodium salt, a boric acid-potassium salt, a boric acid-calcium salt, a boric acid-magnesium salt, aluminum borate, and melamine borate.

17. The battery according to claim 11, wherein
the silicic acid group-containing compound further includes a silicic acid-metal salt, and
the silicic acid-metal salt includes at least one of the group consisting of a silicic acid-lithium salt, a silicic acid-sodium salt, a silicic acid-potassium salt, a silicic acid-calcium salt, a silicic acid-magnesium salt, a silicic acid-barium salt, and a silicic acid-manganese salt.

18. The battery according to claim 11, wherein the filler further includes at least one of a phosphoric acid-sodium salt, a phosphoric acid-lithium salt, ammonium polyphosphate, and melamine polyphosphate.

19. The battery according to claim 11, wherein the filler includes the phosphoric acid-metal salt and the silicic acid group-containing compound.

20. The battery according to claim 11, wherein
the adhesive layer includes at least one of the group consisting of an ammonium salt, dicyandiamide, and melamine as a foaming accelerator, and
the foaming accelerator is decomposed by heat to release a gas component.

* * * * *